United States Patent [19]

Richart

[11] Patent Number: 5,480,726
[45] Date of Patent: Jan. 2, 1996

US005480726A

[54] IN-MOLD COATINGS WITH IMPROVED PERFORMANCE

[75] Inventor: Douglas S. Richart, Reading, Pa.

[73] Assignee: Morton International, Inc., Chicago, Ill.

[21] Appl. No.: 152,627

[22] Filed: Nov. 12, 1993

Related U.S. Application Data

[62] Division of Ser. No. 857,031, Mar. 24, 1992, Pat. No. 5,304,332.

[51] Int. Cl.⁶ ................................................. B32B 27/36
[52] U.S. Cl. .......................... 428/482; 428/480; 525/30; 525/43
[58] Field of Search .................................. 428/480, 482; 427/133, 135, 195; 525/30, 43

[56] References Cited

U.S. PATENT DOCUMENTS

| | | | |
|---|---|---|---|
| 3,216,877 | 11/1965 | Mohr | 156/230 |
| 3,988,288 | 10/1976 | Yamauchi et al. | 260/37 EP |
| 4,205,028 | 5/1980 | Brueggemann et al. | 264/24 |
| 4,228,113 | 10/1980 | van Gasse | 264/24 |
| 4,287,310 | 9/1981 | van Gasse | 525/44 |
| 4,315,884 | 2/1982 | Van Gasse | 264/255 |
| 4,499,235 | 2/1985 | Verwer et al. | 264/255 |
| 4,873,274 | 10/1989 | Cummings et al. | 523/500 |
| 5,212,234 | 5/1993 | Van Gasse et al. | 525/43 |

Primary Examiner—D. S. Nakarani
Attorney, Agent, or Firm—Robert M. Didrick; Gerald K. White

[57] ABSTRACT

The hardness and appearance of an in-mold coating for a molded article of cured unsaturated polyester are improved by the addition of melamine and/or benzoguanamine to an unsaturated polyester powder coating composition and subjecting the modified powder coating to a molding temperature of from about 260° F. to about 340° F. and a pressure of from about 650 psi to about 2000 psi for from 1 to 12 minutes. From about 5 to about 40 parts of the melamine and/or benzoguanamine per hundred parts by weight of the coating resin is used.

6 Claims, No Drawings

IN-MOLD COATINGS WITH IMPROVED PERFORMANCE

This is a divisional of application Ser. No. 07/857,031 filed on Mar. 24, 1992, now U.S. Pat. No. 5,304,332.

TECHNICAL FIELD

This invention relates to a powdered unsaturated polyester resin formulation useful for coating reinforced polyester articles in the mold and to an in-mold coating method employing the formulation whereby the surface of the molding is hardened and thus more scratch resistant. More particularly, it relates to the improved appearance of a molded reinforced polyester article having a smoother, harder surface.

BACKGROUND OF THE INVENTION

In-mold coating is a known technique for decorating or priming the surface of an article formed in a matched die mold under heat and pressure. A coating powder, which can be an unsaturated polyester formulation, is applied electrostatically to the interior wall of the mold. The powder melts and coalesces on the hot mold surface to produce a uniform coating. The fill resin, which constitutes the bulk of the finished article, is then inserted in the mold and heat and pressure is applied. When the cures of the coating and fill resin have advanced sufficiently and said resins are integral, the mold is opened and the molding is removed. It has been found desirable that the coating and fill resins be cross-linked across the interface between them to maximize the adhesion of one to the other.

The following patents relate to in-mold coating techniques of the type used in this invention:

U.S. Pat. Nos. 3,216,877, 4,205,028, 4,228,113, 4,287,310, 4,315,884, 4,499,235, 4,873,274.

British Patent Specification No. 1,420,867 teaches an analagous process except that the fill resin is first formed in the mold and apparently cured, then removed from the mold. The mold is powder coated and the formed resin is returned to the mold and remolded to apply the coating. The teachings of U.S. Pat. No. 4,873,274 about combinations of initiators is hereby incorporated herein by reference.

The surface hardness, i.e., the scratch resistance, and smoothness of molded articles of reinforced polyester on the market still leave something to be desired. For example, the manufacturers of molded sinks and bathtubs usually warn the users that the use of abrasive cleaners will mar the pleasing appearance of their surfaces. The scratching of such surfaces by the movement of accessories thereon has also been a problem. Elimination of the phenomenon known as telegraphing, i.e., the visibility of reinforcing glass fibers under the surface, also has continued to be a problem up to the time of this invention.

The surface hardness can be increased by the use of more highly functional monomers such as triallylcyanurate, diallylphthalate, divinylphthalate, and other multi-functional monomers or polymers in the coating powder composition. The use of higher levels of these materials, however, increases the reactivity of the coating powder, rendering it less stable on room temperature storage and causing premature polymerization when applied to the mold. Tearing of the powder coating results when such a powder is placed on the mold surface, the fill resin is charged to the mold, and the mold is closed under pressure. Also, most allylic monomers and prepolymers have a low vapor pressure and an undesirable odor which produce undesirable effects during application and molding. The presence of such allylic monomers in the coating powder also lowers the $T_g$ of the coating powder, causing it to block during storage or shipment. Further, these expensive monomers increase the cost of the in-mold coating powder.

SUMMARY OF THE INVENTION

It is an object of this invention, therefore, to provide a match molded reinforced polyester article whose surface has excellent scratch resistance.

It is another object of this invention to provide such an article having a surface of superior smoothness with essentially no telegraphing.

It is a related object of this invention to provide a coating powder which produces a smoother, harder surface on a reinforced polyester article when it is used to coat the mold in which the article is produced.

It is a further related object of this invention to provide a method for molding a reinforced polyester article so that it has a surface having excellent hardness and smoothness.

These and other objects of the invention which will become apparent from the following description of the invention are achieved by adding from about 5 to about 40 parts, preferably from about 10 to about 25 parts, of melamine and/or benzoguanamine to each 100 parts by weight of resin in an unsaturated polyester powder coating composition, applying the powder coating to the mold surface, heating the mold surface to a temperature of from about 260° to about 340° F. (from about 127° C. to about 171° C.), then inserting a fill resin in the thus coated mold, and closing the mold and pressurizing it. The term "resin" in this context means the combination of the unsaturated polyester coating powder resin and the monomer or oligomer which is co-polymerized with said polyester resin to the exclusion of initiators, pigments, fillers, and additives.

DETAILED DESCRIPTION OF THE PREFERRED EMBODIMENTS

The melamine and benzoguanamine are added as a fine powder which passes through a 200 mesh sieve. It is preferred to add colloidal silica to the ground melamine at a level of about 0.2% by weight of the melamine to aid in the screening and prevent caking of the powder during storage. The melamine and/or benzoguanamine may be dry mixed with the other ingredients of the composition in a tumbler or other similar mixing apparatus for from about 1 to about 30 minutes until a homogeneous blend is achieved. Any ingredients which are liquid at the mixing temperature may be absorbed onto a dry substrate, which may be one of the other ingredients of the composition. Next, the mixture is melt-mixed, preferably in an extruder. An extruder mixes, dissolves, and disperses the ingredients and extrudes the mixture so that a uniform composition is obtained. The extrudate is then passed through chill rolls to solidify it and prevent premature curing. The rolled mixture is passed through a chipper to reduce it to a form which can be easily ground to a powder. The powder is screened to remove all particles which will not pass through a No. 60 screen (U.S. Standard Sieve Series). If necessary, the grinding steps may be conducted at a reduced temperature to prevent the ingredients from being melted by the grinding process. Alternatively, the unsaturated polyester coating composition may be extruded and pulverized and then dry blended with the powdered melamine and/or benzoguanamine.

Unsaturated polyester coating powder compositions according to the present invention comprise, in addition to the melamine and/or benzoguanamine, from about 20 to about 100 parts by weight of at least one unsaturated polyester resin, from 0 to about 80 parts by weight of at least one copolymerizable monomer or oligomer, and from about 0.01 to about 15 parts by weight of an initiator per 100 parts of the combined weight of said resin and monomer or oligomer.

The unsaturated polyester resins are thermoplastic but cross-linkable reaction products of organic di- or polyfunctional acids and di- or polyfunctional alcohols. Small amounts of monofunctional acids and alcohols may be present for chain termination purposes. Although the unsaturation may be supplied by the alcohol, the acid is typically the source of unsaturation. Saturated acids may be present also to reduce the degree of unsaturation in the polyester. Preferably, the unsaturated polyester resins melt at a temperature substantially above room temperature but below the desired mold temperature.

The ethylenically unsaturated di- and polyfunctional acids and anhydrides which are useful herein are exemplified by maleic anhydride; fumaric acid; citraconic anhydride; itaconic acid; mesaconic acid; dimeric methacrylic acid; endo-cis-bicyclo[2,2,1]-5-heptene-2,3-dicarboxylic acid; methyl bicyclo[2,2,1]-heptene-2,3-dicarboxylic anhydride; and chlorendic acid. Examples of saturated diacids and polyacids which are contemplated as components of the polyesters in combination with a substantial proportion of the unsaturated acids include tetrachlorophthalic acid; tetrabromophthalic acid; phthalic anhydride; adipic acid; tetrahydrophthalic acid; isophthalic acid; terphthalic acid; trimellitic acid; azelaic acid; sebacic acid; succinic acid; dodecanedicarboxylic acid; hexahydrophthalic acid and its anhydride; malonic acid; oxalic acid; pimelic acid; and pyromellitic anhydride. Monocarboxylic acids contemplated herein as chain terminators are exemplified by linoleic acid; linolenic acid; geranic acid; sorbic acid; fatty acids, abietic acid; methacrylic acid; and benzoic acid.

The difunctional alcohols contemplated as being useful in this invention are exemplified by ethylene-, diethylene-, and triethylene glycol; 1,2- and 1,3-propylene glycol; butylene glycols; cyclopentanediols; cyclohexanediols; 4,4'-methylene-bis(cyclohexanol); 4,4'-isopropylidene-bis(cyclohexanol); 1,3-bis(hydroxymethyl)cyclohexane; bisphenol A; neopentyl glycol; hexanediols; 2,2,4-trimethyl-1,3-pentanediol; and the ethylene oxide and propylene oxide adducts of bisphenol A and hydroquinone.

Polyols having 3 or more hydroxyl groups per molecule may also be used in small quantities to form branched polyesters. Representatives of the polyols include glycerol; trimethylolpropane; pentaerythritol; allyl ether polyols; sorbitol; and mannitol.

The polyester resins useful in this invention work best in combination with copolymerizable, ethylenically unsaturated monomers and/or oligomers or second resins. It is preferred that these monomers or oligomers or second resins have two sites of unsaturation per molecule. The following are among the preferred materials: iso- and para-diallylphthalate monomers and prepolymers; triallyl isocyanurate; N,N'-methylene-bis-acrylamide; N, N'-diallylmelamine; neopentyl glycol diacrylate; maleinimide; diacetone acrylamide dimer; pentaerythritol di-, tri-, and tetra-acrylates, and low molecular weight polybutadienes. A predominance of monomers or prepolymers which are solid at room temperature is highly preferred so that non-sintering powders may be easily formulated from the mixture thereof with the polyester resin. If the second resin, the oligomer, or the monomer is a liquid and is used in sufficient quantity that the resulting melt-mixed composition is not free flowing, it may be absorbed on an inert filler such as fumed silica to give a solid material for this invention. Except in small quantities, these liquid species are much less desirable than the solid monomers, oligomers, and resins because of the liquid's tendency to evaporate when placed on the hot surface of the mold.

Curing of the resin mixture is accomplished by the action of initiators at sites of ethylenic unsaturation. The initiators may be classified as fast, moderate, and slow according to their half-life temperatures. The temperature at which the half-life of an initiator is 10 hours (i.e., half of the initiator decomposes every 10 hours) is known as the ten hour half-life temperature or $T_{1/2}$ (10 hours). Initiators having a ten hour half-life at not more than 82° C. and preferably not less than about 50° C. are classified as fast initiators for the purposes of this invention. Examples of these include diacyl peroxides such as benzoyl peroxide, acetyl alkylsulfonyl peroxides such as acetyl cyclohexylsulfonyl peroxide (even though their ten hour half-lives are from about 32° to about 42° C.), dialkyl peroxydicarbonates such as di-(n-propyl) peroxydicarbonate, peroxy esters such as alpha-cumylperoxy-neodecanoate and t-butylperoxy isobutyrate, and certain azo-bis (alkyl nitrile) compounds such as 2,2'-azobis-(2,4-dimethyl-valeronitrile. Moderate initiators are those which have a ten hour half-life between 82° and 91° C. and are exemplified by t-butyl peroxymaleic acid. An initiator having a ten hour half-life at more than 91° C. and preferably no more than 100° C. is classified as a slow initiator. It is exemplified by peroxy ketals, such as 1,1'-di(t-butylperoxy)-3,3,5-trimethylcyclohexane, and dialkylperoxides, such as dicumyl peroxide and 2,5-dimethyl-2,5 -di(t-butylperoxy) hexyne-3. Hydroperoxides, ketone peroxides, 0,0-t-alkyl-O-alkylmonoperoxycarbonates, p,p'-oxybis(benzene sulfonyl hydrazide) and an accelerated azocarbonamide sold under the trademark Celogen are further examples of the slow initiators contemplated for use in this invention. Single initiators or mixtures of initiators of the same or different classes may be used.

Additives such as polymerization inhibitors, polymerization accelerators, leveling agents, and lubricants or mold parting agents such as zinc stearate may also be incorporated into the in-mold coating powders of this invention. Polymerization inhibitors increase the storage life of some polyester compositions and are exemplified by benzoquinone, hydroquinone, and t-butyl catechol. Polymerization accelerators act in conjunction with the initiator to speed the rate of reaction and are exemplified by cobalt octoate, cobalt naphthenate, and diethyl aniline. Examples of the leveling agent include polyacrylic acid, non-ionic fluorinated alkyl ester surfactants, non-ionic alkylaryl polyether alcohols.

For each 100 parts by weight of resin in the formulation, from 0 to about 100 parts by weight each of pigments, fillers, opacifiers, antioxidants, and ultraviolet absorbers may be added.

Some of the pigments contemplated are: carbon black, titanium oxide, chrome oxide (green), zinc oxide, ferrite yellow oxide, ferric oxides, raw sienna, burnt sienna, copper phthalocyanine blue, phthalocyanine green, ultramarine blue, toluidine red, parachlor red, cadmium reds and yellows, iron blues, and organic maroons. Silica, glass frit or flour, calcium carbonate, mica, antimony trioxide, fumed alumina, kaolin, talc, lithopone, zinc sulfide, zirconium oxide, calcium sulfate dihydrate, barium sulfate, china clay, diatomaceous earth, aluminum trihydrate, onyx flour, and calcium silicate are examples of fillers and opacifiers contemplated. The fillers, pigments, and opacifiers may be suspended in the coating composition by the use of dispersing agents such as those taught in U.S. Pat. No. 4,016,115, which is hereby incorporated herein by reference.

The method for forming a molded article having a cured, hardened, unsaturated polyester coating on a cured, unsaturated polyester fill resin begins by providing one of the coating powder compositions described above, heating the mold surface to a temperature which is preferably from about 127° to about 171° C., and applying the powder coating to that surface. Then the mold surface is maintained at the desired temperature until the powder melts, flows and coalesces on the surface, forming a partially cross-linked coating having an outer surface (defined herein as the surface against the mold surface) and an opposed inner surface. Next, the inner surface of the coating is contacted with a no more than partially cross-linked unsaturated polyester fill resin. In a preferred mode of the invention the fill resin is a glass fiber reinforced plastic mass of molding material such as sheet molding compound (SMC), dough molding compound (DMC), bulk molding compound (BMC), or the like. The coating and fill resin are kept within the closed mold at a temperature of from about 260° to about 340° F. and a pressure of from about 650 psi to about 2000 psi (from about 450 $N/cm^2$ to about 1380 $N/cm^2$) for a period of from about 1 minute to about 12 minutes or until the fill resin has flowed to its final dimensions and it and the coating have each cured sufficiently to allow the article to be removed without damaging it. At this point the coating and the substrate fill resin will have cross-linked across the interface between them, thereby providing a strongly adherent coating which is not easily chipped away or otherwise separated from the substrate.

A particular in-mold powder coating composition will perform optimally at a particular temperature, pressure, and mold cycle time. A particular formulation may be adapted to particular molding conditions by determining the stroke cure time for the desired molding conditions, then revising the particular formulation, usually by modifying the quantity or selection of initiators, to achieve the desired stroke cure time. The stroke cure time may be changed substantially by a small change in the proportion of the fast initiator, which preferably constitutes only from about 0.01 to about 2 parts per hundred parts of coating resin. The cure rate of the formulation can thus be adapted to particular molding times, pressures, and temperatures without substantially changing other properties of the formulation such as its melt viscosity, or pigment or filler loading. To compensate for an increased molding temperature, a slower initiator system nay be used. To compensate for a higher molding pressure, a faster initiator system may be used. To allow a shorter mold time, a faster initiator system or more of a fast initiator may be used.

The stroke cure time of a coating powder composition is measured by distributing ¼ teaspoon (1.2 ml) of the powder directly on the steel surface of a hot plate preheated to 300°± 2° F. (149°±1° C.) to form a one inch (2.5 cm) diameter spot. The coating is then kneaded with a spatula on the hot plate until it melts, at which time a timer is started. The melt is patted with the spatula until strings are no longer pulled from the melt by the spatula, at which time the timer is read and the reading is recorded as the stroke cure time. A fast formulation (not to be confused with a fast initiator) will have a stroke cure time of from 10 to 19 seconds; the time for a moderate formulation will be from 20 to 29 seconds; for a slow formulation—from 30 to 39 seconds; and for a very slow formulation it will be 40 or more seconds.

If molding conditions are optimized for the purpose and the coating is pigmented or otherwise adapted for use as an exterior coating, the article may be used or sold as molded. Otherwise, the article may be decorated as desired.

The moldability of an in-mold coating powder composition is determined by evaluating the surface of an article coated therewith after demolding. Moldability is considered good if the coating parts cleanly from the mold surface and adheres tightly to the article over the entire coated surface. Aesthetic defects such as washouts, tearing, lifting, and bubbles are substantially absent in a coating having good moldability. Washouts are characterized by filigree type tearing, multiple small holes in the coating, and a marbleized appearance. Tearing is a clean-edged split in the coating which renders a groove of the underlying fill resin visible if it is of a contrasting color. Lifting is a small network of cracks extending through the coating and into the fill resin. Little regions of the coating defined by the cracks are pulled away from the nominal interface with the fill resin and some of the fill resin is also pulled away. Bubbles and inadequate adhesion between the coating and the substrate are manifestations of incompatibility between the coating composition and the fill resin. Lesser defects include orange peel, yellowing, graininess, mottling, and telegraphing. A coating having excellent aesthetics has very little orange peel, uniform gloss, and no graininess, bubbles or other defects as noted above. Good aesthetics allows for detectable but not prominent telegraphing and other defects. A fair coating has a higher degree of surface roughness, a less uniform gloss where gloss is desirable, and slightly more prominent telegraphing.

In the following working examples, all parts are by weight unless specifically stated otherwise.

EXAMPLE 1

A mixture of 70 parts of a polyester of isophthalic acid, maleic acid, and propylene glycol having an average molecular weight of 2500 (sold by Ashland Chemical under the trademark AROPOL 7501), 30 parts of an iso-diallylphthalate prepolymer having a weight average molecular weight of from 40,000 to 50,000 (sold by GCA Chemical), 3 parts of zinc stearate, 6 parts of n-butyl- 4,4-bis(t-butylperoxy) valerate (40% active ingredient; sold under the trademark LUPERCO 230-XL by Pennwalt), 20 parts of titanium oxide, and 15 parts of melamine (sieved through a 200 mesh screen, and containing 0.2% colloidal silica) was dry mixed until homogeneous and then extruded in a single screw Buss extruder in which the front zone was maintained at 180° F. (82° C.), the rear zone was unheated and the residence time was about 20 seconds. After melt was achieved, the front zone temperature was changed to 165° F. The temperature of the melt was thereby maintained between 190° and 240° F. The extrudate was passed through chill rolls and a chipper and the chips were ground to a powder and screened. Gel time of the powder at 400° F. was 35 seconds. Particles passing through a 60 mesh screen were collected and blended with 12% of their weight of glass microbeads (Potter Brothers 5000). The hot plate melt flow of the powder at 375° F. was 31 mm for 0.75 gram. This value is determined by placing a 12.7 mm×6 mm pellet of the powder on a hot plate set at 375° F. (190°±2° C.) and at an inclination angle of 35° and measuring the distance that the melted resin travels.

EXAMPLE 2

A 22 square inch (142 cm$^2$) shallow, tray-shaped, polished, chrome-plated mold was heated to 300°±10° F. The molding surfaces were electrostatically powder coated with a spray gun fed from a fluidized bed of the powder composition of Example 1. After the powder had melted, flowed, and coalesced on the surface of the mold, a charge of about 160 parts of a fill resin (a sheet molding compound sold by Premix, Inc. as 8204-28 Gray) was placed in the mold. The mold was closed and the resins were pressed at about 1000±200 psi (690±140 N/cm$^2$) for 120 seconds, which was sufficient to cure the fill resin. The press was opened, the article removed and the flash trimmed. The coating was between 4 and 8 mils thick and was quite smooth even though there was a slight orange peel. The smooth surface and reduction in the visibility of the glass fibers of the sheet molding compound gave the article an aesthetically pleasing appearance similar to porcelain. The gloss at a 20° angle was 22 and at 60° it was 68, as measured by the ASTM D-523 procedure. This compares favorably with a coating made, sprayed, molded, and cured in the same manner as the product of Example 1, but without the melamine, whose gloss values at 20° and 60° were 35 and 77, respectively. The coating passed a 5H pencil hardness test (ASTM-D3363) and had a 5 rating in the MEK resistance test at 50 double rubs.

Match-molded bathtubs in-mold coated with the powder coating of Example I in accordance with this invention had a very good surface quality. The hardness of the surface was satisfactory in comparison with commercial in-mold powder coating compositions not containing melamine, but believed to have been cross-linked with triallylcyanurate.

EXAMPLES 3 and 4

The powder coating compositions of this invention shown in Table I and a Control composition having the same ingredients except for the initiator and the melamine were made, sprayed, molded, and cured according to the general procedures of Examples 1 and 2. The initiator, Lupersol 231-XL, is 1,1-di-(t-butylperoxy)- 3,3,5-trimethylcyclohexane on a calcium carbonate carrier (40% active).

TABLE I

|  | CONTROL | EXAMPLE NO. 3 | EXAMPLE NO. 4 |
|---|---|---|---|
| AROPOL 7501 | 80 | 80 | 80 |
| IsoDAP | 20 | 20 | 20 |
| LUPERSOL 231XL | 4 | 4 | 4 |
| ZINC STEARATE | 4 | 4 | 4 |
| TiO$_2$ | 30 | 30 | 30 |
| MELAMINE | — | 10 | 40 |
| Gloss (60°) | 85 | 74 | 72 |
| Surface Appearance | A | B | C |

A = smooth but with glass fibers visible
B = smoother, no visible glass fibers
C = smooth, slight yellowing, no fibers visible The subject matter claimed is:

1. An in-mold coated article comprising a core of a cross-linked unsaturated polyester resin and a surface layer of a cross-linked powder coating consisting of from about 20 to about 100 parts by weight of at least one unsaturated polyester resin, from 0 to about 80 parts by weight of at least one copolymerizable, ethylenically unsaturated monomer or oligomer, a surface hardening agent selected from the group consisting of melamine and benzoguanamine, and from about 0.01 to about 15 parts by weight of an initiator per 100 parts of the combined weight of the unsaturated polyester resin and the monomer or oligomer in the surface layer.

2. The article of claim 1 wherein the amount of surface hardening agent is from about 5 to about 40 parts per 100 parts by weight of the combined weight of the unsaturated polyester resin and the monomer or oligomer in the surface layer resin.

3. The article of claim 2 wherein the amount of surface hardening agent is from about 5 to about about 25 parts per 100 parts by weight of the combined weight of the unsaturated polyester resin and the monomer or oligomer in the surface layer.

4. The article of claim 3 wherein the surface hardening agent is melamine.

5. The article of claim 1 wherein the surface hardening agent is melamine.

6. The article of claim 1 wherein the core resin and the surface layer are cross-linked across the interface between them.

* * * * *